United States Patent
Bardman et al.

(10) Patent No.: US 6,673,451 B2
(45) Date of Patent: *Jan. 6, 2004

(54) PROCESS FOR FORMING AN AQUEOUS POLYMERIC DISPERSION

(75) Inventors: James Keith Bardman, Green Lane, PA (US); William Christopher Finch, Blue Bell, PA (US); Robert Mitchell Blankenship, Harleysville, PA (US)

(73) Assignee: Rohn and Haas Company, Philadelphia, PA (US)

( * ) Notice: Subject to any disclaimer, the term of this patent is extended or adjusted under 35 U.S.C. 154(b) by 176 days.

This patent is subject to a terminal disclaimer.

(21) Appl. No.: 09/965,378

(22) Filed: Sep. 27, 2001

(65) Prior Publication Data

US 2002/0072560 A1 Jun. 13, 2002

Related U.S. Application Data

(60) Provisional application No. 60/239,643, filed on Oct. 12, 2000.

(51) Int. Cl.$^7$ ............................ B32B 23/12; C08J 6/16
(52) U.S. Cl. ............................ 428/402.22; 428/402.2; 525/243; 525/94; 521/56; 521/59; 521/60; 521/65
(58) Field of Search ................ 428/402.2, 402.22; 521/56, 59, 60, 65; 525/243

(56) References Cited

U.S. PATENT DOCUMENTS

| 4,395,500 A | | 7/1983 | Lohr et al. ................. 523/221 |
|---|---|---|---|
| 4,539,361 A | | 9/1985 | Siol et al. .................. 524/458 |
| 4,567,099 A | | 1/1986 | Van Gilder et al. ......... 428/327 |
| 4,594,363 A | | 6/1986 | Blankenship et al. ......... 521/64 |
| 4,970,241 A | | 11/1990 | Kowalski et al. ............. 521/57 |
| 4,972,000 A | | 11/1990 | Kawashima et al. .......... 521/54 |
| 5,026,782 A | * | 6/1991 | Biale ......................... 525/317 |
| 5,053,441 A | * | 10/1991 | Biale ......................... 523/201 |
| 5,229,209 A | * | 7/1993 | Gharapetian et al. ....... 428/403 |
| 5,273,824 A | | 12/1993 | Hoshino et al. ........ 428/402.24 |
| 5,521,253 A | * | 5/1996 | Lee et al. ................... 525/301 |
| 5,545,695 A | * | 8/1996 | Blankenship ............... 525/301 |
| 5,618,888 A | | 4/1997 | Choi et al. .................. 525/301 |
| 5,639,805 A | * | 6/1997 | Park et al. .................. 523/201 |
| 5,989,630 A | * | 11/1999 | Schlarb et al. ......... 427/213.36 |
| 6,043,319 A | * | 3/2000 | Lee et al. ................... 525/301 |

FOREIGN PATENT DOCUMENTS

| EP | 0203724 B1 | 4/1986 |
|---|---|---|
| EP | 0959176 A1 | 5/1999 |
| JP | 3-340774 | 12/1991 |
| WO | WO 00/68304 | 11/2000 |

* cited by examiner

*Primary Examiner*—D. Lawrence Tarazano
(74) *Attorney, Agent, or Firm*—Ronald D. Bakule

(57) ABSTRACT

A process for forming certain aqueous polymeric dispersions including a first emulsion polymer having an average particle diameter of 150 to 3000 nanometers and a second emulsion polymer having an average particle diameter of 40 to 600 nanometers where at least the first emulsion polymer particles, when dry, contain at least one void is provided. Also provided are the aqueous polymeric dispersions made by the process and paper or paperboard coatings and paints including the aqueous polymeric dispersions.

5 Claims, No Drawings

PROCESS FOR FORMING AN AQUEOUS POLYMERIC DISPERSION

Cross Reference To Related Patent Applications

This is a non-provisional application of prior pending U.S. provisional application serial No. 60/239,643 filed Oct. 12, 2000.

This invention relates to a process for forming an aqueous polymeric dispersion, an aqueous polymeric dispersion formed by the process, and a coating composition such as, for example, a waterborne paper or paperboard coating composition or a paint composition comprising the aqueous polymeric dispersion. More specifically, this invention relates to an aqueous multimodal polymeric dispersion including at least two emulsion polymers of differing particle diameter, at least one of which emulsion polymers includes a core and at least two shells, the first shell having a glass transition temperature ("Tg") greater than 50° C. and the outermost shell having a Tg from 10° C. to −50° C. and contains at least one void.

Coated paper and paperboard is usually printed and the coating must exhibit a useful level of smoothness and opacity as well as sufficient strength to withstand the printing operation. Coating opacity and strength are primarily effected by the selection of and amounts of polymeric binder and pigments to be used in the coating with some contribution from the coating application, drying, and finishing methods used. Aqueous polymeric dispersions having a multimodal particle size distribution offer the potential of higher solids emulsion polymer products and higher solids paper and paperboard coatings compositions which properties are beneficial for improving sheet gloss, particularly in formulations containing as pigment predominant amounts of calcium carbonate. Aqueous polymeric dispersions having a bimodal particle size distribution also offer the potential of higher solids paint compositions such as, for example, interior and exterior paints for architectural substrates which properties are beneficial for lessening thickener demand and providing greater formulation latitude.

U.S. Pat. No. 4,567,099 discloses bimodal latexes having two separate and distinct particle size distributions. The latexes are employed in coating paper in conjunction with a mineral filler. The larger size particles contain both relatively harder cores and relatively softer shell domains. The smaller size particles are either separately formed and subsequently blended together or prepared by adding a seed latex simultaneously to or after the shell domain of the large size particle is formed. However, void-containing particles and higher levels of solids than can be achieved with these coatings is desirable.

JP 5-170802 discloses emulsion particles including a group of hollow particles in which voids are present inside the particles during drying and, additionally, a group of smaller particles for use in paper coatings.

EP 959176 discloses hollow sphere organic pigment for use in paper or paper coatings, the hollow sphere organic pigment being formed by a multistage emulsion polymerization, the emulsion particles having at least one core and two shells.

The problem faced by the inventors is the provision of a process for forming aqueous polymeric dispersion suitable for forming coating compositions such as aqueous coating compositions for coating paper and paperboard and aqueous paint compositions. Although emulsion polymer particles containing a void have been disclosed for use in aqueous coatings, such particles contain a void filled with water, or, on drying, a void filled with air. The larger the void, the lower the effective density of the particle and the lower the solids of the emulsion polymer and, all else being equal, the lower the maximum solids content of the coating composition at a useable viscosity. We have now found that aqueous polymeric dispersion of this invention afforded by a bimodal emulsion polymer particle size distribution with at least one of the particle populations containing voids permits higher solids paper and paperboard coating compositions than could otherwise have been formed resulting in higher sheet gloss, particularly in certain calcium carbonate-containing formulations, and lowered drying energy requirements. We have also found that the aqueous polymeric dispersion of this invention is suitable for forming paint compositions.

STATEMENT OF THE INVENTION

According to a first aspect of the present invention there is provided a process for forming an aqueous polymeric dispersion including (1) forming emulsion-polymerized multistaged first polymer particles having (a) a hydrophilic core polymer formed from 5% to 100% by weight, based on the total weight of the core polymer, of a hydrophilic monoethylenically unsaturated monomer and from 0% to 95% by weight, based on the total weight of the core polymer, of at least one nonionic monoethylenically unsaturated monomer; (b) a first shell polymer formed from 90% to 99.9% by weight, based on the total weight of the first shell polymer, of at least one nonionic monoethylenically unsaturated monomer and from 0.1% to 10% by weight, based on the total weight of the first shell polymer, of an acid functional monoethylenically unsaturated monomer, wherein the first shell polymer fully encapsulates the core polymer, wherein the ratio of the weight of the core polymer to the weight of the first shell polymer is from 1:2 to 1:100, and wherein the first shell polymer has a glass transition temperature greater than 50° C. and (c) a second shell polymer formed from 93% to 99.9% by weight, based on the total weight of the second shell polymer, of at least one nonionic monoethylenically unsaturated monomer and from 0.1% to 7% by weight, based on the total weight of the second shell polymer, of an acid functional monoethylenically unsaturated monomer, wherein the second shell polymer is formed in the presence of the first shell polymer, and wherein the second shell polymer has a glass transition temperature from 10° C. to −50° C., and wherein the second shell polymer is at least 10% by weight of the total weight of the first shell polymer and the second shell polymer; (2) forming a second emulsion polymer in the presence of the first emulsion polymer by (a) adding, after the core polymer has been formed, an amount of surfactant sufficient to generate new particles or an emulsion-polymerized seed latex having a particle diameter less than 200 nanometers to the polymerization; (b) then adding any remainder of the first shell polymer monomer mixture and then any remainder of the second shell polymer monomer mixture and from 0 to 90% by weight, based on the weight of the solids of the aqueous polymeric dispersion, of at least one ethylenically unsaturated monomer; (3) effecting polymerization of at least 95% of all added monomer by weight based on the weight of the solids of the aqueous polymeric dispersion; and (4) neutralizing the aqueous dispersion formed with a base so as to swell the core and form particles which, when dry, contain a void.

According to a second aspect of the present invention there is provided a process for forming an aqueous polymeric dispersion including (1) forming a first emulsion polymer having particles formed from at least one ethylenically unsaturated monomer; (2) forming a second emulsion polymer including (a) a hydrophilic core polymer formed from 5% to 100% by weight, based on the total weight of the core polymer, of a hydrophilic monoethylenically unsaturated monomer and from 0% to 95% by weight, based on the total weight of the core polymer, of at least one nonionic monoethylenically unsaturated monomer; (b) a first shell polymer formed from 90% to 99.9% by weight, based on the total weight of the first shell polymer, of at least one nonionic monoethylenically unsaturated monomer and from 0.1% to 10% by weight, based on the total weight of the first shell polymer, of an acid functional monoethylenically unsaturated monomer, wherein the first shell polymer fully encapsulates the core polymer, wherein the ratio of the weight of the core polymer to the weight of the first shell polymer is from 1:2 to 1:100, and wherein the first shell polymer has a glass transition temperature greater than 50° C.; and c) a second shell polymer formed from 93% to 99.9% by weight, based on the total weight of the second shell polymer, of at least one nonionic monoethylenically unsaturated monomer and from 0.1% to 7% by weight, based on the total weight of the second shell polymer, of an acid functional monoethylenically unsaturated monomer, wherein the second shell polymer is formed in the presence of the first shell polymer, and wherein the second shell polymer has a glass transition temperature from 10° C. to −50° C., and wherein the second shell polymer is at least 10% by weight of the total weight of the first shell polymer and the second shell polymer; and (3) effecting polymerization of at least 95% of all added monomer by weight based on the weight of the solids of the aqueous polymeric dispersion; and (4) neutralizing the aqueous dispersion formed with a base so as to swell the core and form second emulsion polymer particles which, when dry, contain a void.

According to a third aspect of the present invention there is provided an aqueous polymeric dispersion including (a) 95–25% by weight, based on the weight of the solids of the aqueous polymeric dispersion, of a first emulsion polymer having an average particle diameter of 150 to 3000 nanometers and (b) 5–75% by weight, based on the weight of the solids of the aqueous polymeric dispersion, of a second emulsion polymer having an average particle diameter of 40 to 600 nanometers wherein the ratio of the average particle diameter of the first emulsion polymerized polymer to the average particle diameter of the second emulsion polymerized polymer is from 1.2 to 60, and wherein at least the first emulsion polymer particles, when dry, contain at least one void, the aqueous polymeric dispersion having been formed by the process of the first or second aspect of the present invention.

According to a fourth aspect of the present invention there is provided a waterborne paper or paperboard coating composition including the aqueous polymeric dispersion of the third aspect of the present invention.

According to a fifth aspect of the present invention there is provided a waterborne paint composition including the aqueous polymeric dispersion of the third aspect of the present invention.

DETAILED DESCRIPTION

The aqueous polymeric dispersion of this invention, when dried, contains multistaged polymer particles containing a void, the void-containing core being encapsulated by at least two shells and other polymer particles, either solid particles or particles also containing a void, differing in average particle diameter from the average particle diameter of the multistaged polymer particles.

The aqueous polymeric dispersion of this invention is prepared by a sequential emulsion polymerization. In the process of the first aspect of this invention certain multistaged particles which, when dry, contain a void are formed first by emulsion polymerization, followed by the formation, in the presence of the first-formed particles, of relatively smaller polymer particles which, when dry, may or may not contain a void. The hydrophilic core polymer of the first polymer particles of the first aspect of this invention is the product of emulsion polymerizing from 5% by weight to 100% by weight, based on the total weight of the core polymer, of a hydrophilic monoethylenically unsaturated monomer and from 0% by weight to 95% by weight, based on the total weight of the core polymer, of at least one nonionic monoethylenically unsaturated monomer.

The hydrophilic core polymer of the multistaged polymer particles of this invention is the product of emulsion polymerizing from 5% by weight to 100% by weight, based on the total weight of the core polymer, of a hydrophilic monoethylenically unsaturated monomer and from 0% by weight to 95% by weight, based on the total weight of the core polymer, of at least one nonionic monoethylenically unsaturated monomer.

Hydrophilic core polymers containing at least 5% by weight, based on the total weight of the core polymer, of at least one hydrophilic monoethylenically unsaturated monomer have practical swellability for the purposes of the present invention. There may be instances wherein, because of the hydrophobicity of certain comonomers or combinations thereof in conjunction with the hydrophobic/hydrophilic balance of a particular acid monomer, the copolymer may require less than 5% by weight, based on the total weight of the core polymer. Preferably, the level of hydrophilic monomer is from 5% to 100% by weight, based on the total weight of the core polymer; more preferably, from 20% to 60% by weight; and most preferably, from 30% to 50% by weight. The hydrophilic core polymer may be made in a single stage or step of the sequential polymerization or may be made by a plurality of steps in sequence.

The hydrophilic core polymer includes at least one hydrophilic monoethylenically unsaturated monomer which is polymerized alone or with at least one nonionic monoethylenically unsaturated monomer. Included in the term "hydrophilic monoethylenically unsaturated monomer" is a nonpolymeric compound containing at least one carboxylic acid group which absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomers useful for making the core polymer include monoethylenically unsaturated monomers containing acid-functionality such as monomers containing at least one carboxylic acid group including (meth)acrylic acid [by "(meth)acrylic" herein is meant acrylic or methacrylic], (meth)acryloxypropionic acid, itaconic acid, aconitic acid, maleic acid, fumaric acid, crotonic acid, monomethyl maleate, monomethyl fumarate, monomethyl itaconate and the like. Acid precursors such as anhydrides, for example maleic anhydride, are included. Acrylic acid and methacrylic acid are preferred.

Suitable nonpolymeric compounds containing at least one carboxylic acid group include $C_6$–$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

Suitable nonionic monoethylenically unsaturated monomers for making the hydrophilic core polymer include styrene, α-methyl styrene, vinyltoluene, ethylene, vinyl acetate, vinyl chloride, vinylidene chloride, acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate and the like.

The hydrophilic core polymer, whether obtained by a single stage process or a process involving several stages, has an average size of 50 to 2000 nanometers, preferably 100 to 1000 nanometers, more preferably 150 to 500 nanometers, diameter in unswollen condition. If the core is obtained from a seed polymer, the seed polymer may have an average particle size of 30 m to 200 mn.

The hydrophilic core polymer may also optionally contain less than 20% by weight, based on the total weight of the core polymer, preferably 0.1% to 3% by weight, of polyethylenically unsaturated monomer, wherein the amount used is generally approximately directly proportional to the amount of hydrophilic monoethylenically unsaturated monomer used. Alternatively, the hydrophilic core polymer may contain from 0.1% to 60% by weight, based on the total weight of the core polymer, of butadiene.

Suitable polyethylenically unsaturated monomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate, allyl acrylate, diallyl maleate, diallyl fumarate, diallyl itaconate and the like.

After the hydrophilic core polymer has been formed a tiecoat may be formed on the hydrophilic core. The tiecoat (referred to in some prior patents as "the first stage of sheath formation") may be an acrylic polymer which compatibilizes the hydrophilic core polymer with the one or more hydrophobic shell polymers, particularly for a hydrophilic core polymer having a particle size diameter of less than 280 nanometers (nm).

The first shell polymer is formed from 90% by weight to 99.9% by weight, based on the total weight of shell polymer, of at least one nonionic monoethylenically unsaturated monomer and from 0.1% by weight to 10% by weight, based on the total weight of the shell polymer, of an acid-functional monoethylenically unsaturated monomer. The second shell polymer is formed from 93% by weight to 99.9% by weight, based on the total weight of shell polymer, of at least one nonionic monoethylenically unsaturated monomer and from 0.1% by weight to 7% by weight, based on the total weight of the shell polymer, of an acid-functional monoethylenically unsaturated monomer.

Suitable nonionic monoethylenically unsaturated monomers for making the first or second hydrophobic shell polymer include styrene, α-methyl styrene, vinyltoluene, ethylene, vinyl acetate, vinyl chloride, vinylidene chloride, acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate and the like. Styrene is preferred for the first shell polymer.

Suitable monoethylenically unsaturated monomers containing acid-functionality for making the first or second hydrophobic polymer shell include acrylic acid, methacrylic acid, acryloxypropionic acid, (meth)acryloxypropionic acid, itaconic acid, aconitic acid, maleic acid, fumaric acid, crotonic acid, monomethyl maleate, monomethyl fumarate, monomethyl itaconate and the like. Acid precursors such as anhydrides, for example maleic anhydride are included. Acrylic acid and methacrylic acid are preferred.

The first shell polymer fully encapsulates the core polymer. The ratio of the weight of the core polymer to the weight of the first shell polymer is from 1:2 to 1:100. The first shell polymer has a glass transition temperature ("Tg") greater than 50° C. Preferred is a Tg of the first shell polymer of greater than 90° C.

The second shell polymer is formed in the presence of the first shell polymer. There may be other shell polymer compositions or tiecoats formed after the first shell polymer has been formed, but in any event they are formed before the second shell polymer is formed. The second shell polymer has a glass transition temperature from 10° C. to −50° C., and the second shell polymer is at least 10% by weight of the total weight of the first shell polymer and the second shell polymer.

Glass transition temperatures (Tgs) herein are those calculated by the Fox Equation, that is, for calculating the Tg of a copolymer of monomers M1 and M2, $$1/Tg(calc.) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2

All temperatures used in this calculation are expressed in °K.

The glass transition temperature of homopolymers may be found, for example, in "Polymer Handbook", edited by J. Brandrup and E. H. Immergut, Interscience Publishers.

As used herein, the term "multistaged" or "sequentially" emulsion polymerized" refers to polymers (including homopolymers and copolymers) which are prepared in aqueous medium by an emulsion polymerization process wherein the dispersed polymer particles of a preformed latex or "seed" polymer in the aqueous medium are increased in size by deposition thereon of polymerized product of one or more successive monomer charges introduced into the medium containing dispersed particles of the preformed latex in one or more subsequent stages.

The term "seed" polymer is used herein to refer to an aqueous emulsion polymer dispersion which may be the initially-formed dispersion, that is, the product of a single stage of emulsion polymerization or it may be the emulsion polymer dispersion obtained at the end of any subsequent stage except the final stage of the sequential polymerization. Thus, a hydrophilic core polymer which is herein intended to be fully encapsulated with shells by at least two subsequent stages of emulsion polymerization may itself be termed a seed polymer for the next stage wherein the shell-forming polymer is deposited on such seed polymer particles.

The first hydrophobic shell polymer may be made in a single stage or step of the sequential polymerization or may be made by a plurality of steps in sequence following the polymerization of hydrophilic core polymer without the need for a tiecoat layer. The first stage of emulsion polymerization in the process of the present invention may be the preparation of a seed polymer containing small dispersed polymer particles insoluble in the aqueous emulsion polymerization medium. This seed polymer may or may not contain any hydrophilic monomer component but provides particles of minute size which form the nuclei on which the hydrophilic core polymer, with or without nonionic comonomer, is formed.

A water-soluble free radical initiator may be utilized in the aqueous emulsion polymerization. Suitable water-soluble free radical initiators include hydrogen peroxide; tert-butyl peroxide; alkali metal such as sodium, potassium and lithium persulfate; ammonium persulfate; and mixture of such an initiator with a reducing agent, such as a sulfite, including an alkali metal metabisulfite, hydrosulfite, and hyposulfite; sodium formaldehyde sulfoxylate; and a reducing sugar, to form a redox system. The amount of initiator may be from 0.01% by weight to 2% by weight of the monomer charged and, in a redox system, 0.01% by weight to 2% by weight of reducing agent may be used. The temperature may be in the range of 10° C. to 100° C. In the case of the persulfate systems, the temperature is preferably in the range of 60° C. to 95° C. In the redox system, the temperature is preferably in the range of 30° C. to 85° C., preferably below 60° C.

Any nonionic or anionic emulsifier may be used, either alone or together. Examples of suitable nonionic type of emulsifier include tert-octylphenoxyethylpoly(39)-ethoxyethanol, polyethylene glycol 2000 monooleate, ethoxylated castor oil, block copolymers of propylene oxide and ethylene oxide, polyoxyethylene(20) sorbitan monolaurate, and nonylphenoxyethylpoly(40) ethoxyethanol. Examples of suitable anionic emulsifiers include sodium lauryl sulfate, sodium dodecylbenzenesulfonate, sodium lauryl ether sulfate, sodium alpha-olefin (C14–C16) sulfonate, ammonium or alkali metal salts of sulfosuccinate derivatives, ammonium or alkali metal salts of fatty acids such as stearic acid, linseed oil fatty acid, and coconut oil fatty acid, ammonium or alkali metal salts of phosphate esters of ethoxylated nonylphenol and tert-octylphenoxyethoxypoly(39)ethoxyethyl sulfate, sodium salt. The viscosity-average molecular weight of the polymer formed in a given stage may range from 100,000, or lower if a chain transfer agent is used, to several million molecular weight. When 0.1% by weight to 20% by weight, based on the weight of the monomer, of a polyethylenically unsaturated monomer mentioned hereinbefore is used in making the acid polymer, the molecular weight is increased whether or not crosslinking occurs. The use of the polyethylenically unsaturated monomer reduces the tendency of the core polymer to dissolve when the multistaged polymer is treated with a swellant for the core. If it is desired to produce a hydrophilic core polymer having a molecular weight in the lower part of the range, such as from 500,000 down to as low as 20,000, it is frequently most practical to do so by avoiding the polyethylenically unsaturated monomers and using a chain transfer agent instead, such as 0.05% to 2% or more thereof, examples being alkyl mercaptans, such as sec-butyl mercaptan.

The polymerization of the first shell polymer or second shell polymer may be performed in the same reaction vessel in which the formation of the core was accomplished or the reaction medium containing the dispersed core particles may be transferred to another reaction container.

The amount of polymer deposited to form shell polymers is generally such as to provide an overall size of the multistage polymer particle of 100 to 2500 nanometers, preferably of 200 to 1500 nanometers, in unswollen condition (that is, before any neutralization to raise the pH to 6 or higher) whether the shell polymers are formed in two or more stages. The second shell polymer is at least 15%, preferably at least 20%, by weight of the first shell polymer and the second shell polymer.

Voids within the multistaged polymer particles may be formed by adding to the hydrophilic core polymer fully encapsulated with a hydrophobic shell polymer, a suitable swelling agent to which the hydrophobic shell polymer is permeable.

In a preferred embodiment, voided polymer particles may be formed by swelling the core polymer with a suitable conjugate base and a solvent, when necessary, which permeates through the shell polymers and then drying the swollen multistaged polymer particles.

The monomers used and the relative proportions thereof in any hydrophobic shell polymer formed should be such that it is permeable to an aqueous or gaseous volatile or fixed basic swellant for the hydrophilic core polymer. Monomeric mixtures for making the hydrophobic shell polymers contain from 0.1% by weight to 10% by weight, based on the total weight of the shell polymer, of an acid-functional monoethylenically unsaturated monomer. However, the proportion of acid-functional monoethylenically unsaturated monomer in any shell polymer should not exceed one-third the proportion thereof in the core polymer. The content of acid-functional monoethylenically unsaturated monomer in the shell polymers may serve several functions:

(1) stabilizing of the final sequential polymer dispersion;
(2) assuring permeability of the hydrophobic shell polymer to a swellant for the hydrophilic core polymer; and
(3) compatibilizing the hydrophobic first shell polymer with the hydrophilic core polymer so that the core may be fully encapsulated with the first shell.

However, higher levels of acid-functional monomer may lead to undesirabe water sensitivity in the paper or paperboard coatings.

The hydrophilic core polymer of the multistage polymer particle is swollen when the polymer particles are subjected to a basic swelling agent that permeates the shell to at least partially neutralize (to a pH of at least 6 to 10) the hydrophilic-functionality of the hydrophilic core polymer and thereby to cause swelling by hydration of the hydrophilic core polymer. The expansion may involve partial merging of the outer periphery of the core into the pores of the inner periphery of the shell and also partial enlargment or bulging of the shell and the entire particle overall. When the swelling agent is removed by drying, the shrinkage of the core tends tends to develop a void, the extent of which depends upon the resistance of the shell to restoration to its previous size. By "void" herein is mean a polymer-free space, typically filled with water in the aqueous dispersion and with air in the dried hollow sphere pigment.

In a preferred embodiment unreacted monomer is provided to the multistage emulsion polymer particle along with the swelling agent under conditions such that substantially no polymerization is occurring. There are many means for providing that no substantial polymerization of monomer is occurring including the addition of one or more polymerization inhibitors, the addition of one or more reducing agents, waiting for a sufficient period of time until there is substantially no radical flux, cooling the contents of the reactor to limit the reactivity of the free radicals, and combinations thereof. A preferred means involves the addition of one or more polymerization inhibitors such as, for example, N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-2,2,6,6-tetramethylpiperidinyloxy free radical, hydroquinone, p-methoxyhydroquinone, t-butyl-p-hydroquinone, 2,5-di-t-butyl-p-hydroquinone, 1,4-napththalenediol, 4-t-butyl catechol, copper sulfate, coppoer nitrate, cresol, and phenol. When used, the polymerization inhibitors are used in an amount effective to substantially stop polymerization, generally from 25 to 5,000 parts per million, preferably from 50 to 3500 parts per million based on polymer solids.

Suitable swelling agents for hydrophilic core polymer include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. Solvents, such as, for example, ethanol, hexanol, octanol, TEXANOL solvent and those described in U.S. Pat. No. 4,594,363, may be added to aid in fixed or permanent base penetration.

When the hydrophilic core polymer is fully encapsulated, it does not titrate with alkali metal bases under normal analytical conditions of 1 hour and at room temperature. To demonstrate full encapsulation in the illustrative examples, samples may be removed during the course of the shell polymerization and titrated with sodium hydroxide.

The second emulsion polymer is formed in the presence of the first emulsion polymer; it may be formed in the same reaction vessel as the first emulsion polymer or in a different place or time or under different conditions from those used in the formation of the first emulsion polymer. In any event after the core polymer of the first emulsion polymer has been formed, the second emulsion polymer formation is initiated by introducing either an amount of surfactant sufficient to form new micelles and, therefrom, new particles or, alternatively, by introducing a emulsion polymerized seed latex having a particle diameter less than 200 nanometers. Preferred is introducing a emulsion polymerized seed latex having a particle diameter less than 200 nanometers. Then the remainder of first emulsion polymer shell monomer mixture, if any, followed by the remainder of second emulsion polymer shell monomer mixture, if any, and from 0 to 90% by weight based on the weight of the solids of the aqueous polymeric dispersion of at least one ethylenically unsaturated monomer are added. The 0 to 90% monomer(s) may be selected from the nonionic and carboxylic acid monomers listed herein as suitable for forming the first emulsion polymer shell with the provisos that (1) if the formation of the second emulsion polymer is begun during the formation of the second shell polymer of the multistaged first polymer particles then the overall composition of the remainder of second emulsion polymer shell monomer mixture and from 0 to 90% by weight based on the weight of the solids of the aqueous polymeric dispersion of at least one ethylenically unsaturated monomer is such that the requirements for the composition of the second polymer shell are met since the polymerization at this stage is cumulative to the shell polymer of the second emulsion polymer as well as to the newly formed or introduced particles or (2) if the formation of the second emulsion polymer is begun during the formation of the first shell polymer of the multistaged first polymer particles then the overall composition of the remainder of first emulsion polymer shell monomer mixture and from 0 to 90% by weight based on the weight of the solids of the aqueous polymeric dispersion of at least one ethylenically unsaturated monomer is such that the requirements for the composition of the first polymer shell are met since the polymerization at this stage is cumulative to the first shell polymer of the first emulsion polymer as well as to the newly formed or introduced particles and the overall composition of the remainder of second emulsion polymer shell monomer mixture and the remainder of the from 0 to 90% by weight based on the weight of the solids of the aqueous polymeric dispersion of at least one ethylenically unsaturated monomer is such that the requirements for the composition of the second polymer shell are met since the polymerization at this stage is cumulative to the second shell polymer of the first emulsion polymer as well as to the newly formed or introduced particles. That is, the second emulsion polymer particles may contain polymer formed in two or more stages, however these stages are geometrically disposed. The monomer in each stage may be added as neat monomer or as a monomer emulsion, in one shot, multiple additions, in a continuous addition or combination thereof. Preferred is the addition as a monomer emulsion in a uniform continuous addition. The polymerization is effected using the surfactant, initiators, and techniques disclosed herein for the formation of the first emulsion polymer shell. Polymerization of at least 95% of all added monomer by weight based on the weight of the solids of the aqueous polymeric dispersion is effected.

In an alternative embodiment, the emulsion polymerized seed latex having a particle diameter less than 200 nanometers which may be used to initiate the formation of the second emulsion polymer has a composition meeting the requirements of a hydrophilic core polymer of the first emulsion polymer and the overall composition of the remainder of first emulsion polymer shell monomer mixture and from 0 to 90% by weight based on the weight of the solids of the aqueous polymeric dispersion of at least one ethylenically unsaturated monomer meets the requirements for the composition of the first polymer shell. In this case the second emulsion polymer will form particles which, on drying, contain a void when neutralizing the aqueous polymer dispersion with a base is effected, but having a different particle size from the first emulsion polymer.

First emulsion polymer particles and, optionally, second emulsion polymer particles, containing a void are formed by adding to the hydrophilic core polymer, when fully encapsulated with a hydrophobic shell polymer, a suitable swelling agent to which the hydrophobic shell polymer is permeable.

In a preferred embodiment, voided polymer particles may be formed by swelling the core polymer with a suitable conjugate base and a solvent, when necessary, which permeates through the shell polymers and then drying the swollen multistaged polymer particles.

The monomers used and the relative proportions thereof in any hydrophobic shell polymer formed should be such that it is permeable to an aqueous or gaseous volatile or fixed basic swellant for the hydrophilic core polymer. Monomeric mixtures for making the hydrophobic shell polymers contain from 0.1% by weight to 10% by weight, based on the total weight of the shell polymer, of an acid-functional monoethylenically unsaturated monomer. However, the proportion of acid-functional monoethylenically unsaturated monomer in any shell polymer should not exceed one-third the proportion thereof in the core polymer.

The hydrophilic core polymer of the multistage polymer particle is swollen when the polymer particles are subjected to a basic swelling agent that permeates the shell to at least partially neutralize (to a pH of at least 6 to 10) the hydrophilic-functionality of the hydrophilic core polymer and thereby to cause swelling by hydration of the hydrophilic core polymer. The expansion may involve partial merging of the outer periphery of the core into any pores of the inner periphery of the shell and also partial enlargment or bulging of the shell and the entire particle overall. When the swelling agent is removed by drying, the shrinkage of the core tends tends to develop a void, the extent of which depends upon the resistance of the shell to restoration to its previous size. By "void" herein is mean a polymer-free space, typically filled with water in the aqueous dispersion and with air in the dried hollow sphere pigment.

In a preferred embodiment unreacted monomer is provided to the multistage emulsion polymer particle along with the basic swelling agent under conditions such that substantially no polymerization is occurring. There are many means for providing that no substantial polymerization of monomer is occurring including the addition of one or more polymerization inhibitors, the addition of one or more reducing agents, waiting for a sufficient period of time until there is substantially no radical flux, cooling the contents of the reactor to limit the reactivity of the free radicals, and combinations thereof. A preferred means involves the addition of one or more polymerization inhibitors such as, for example, N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-2,2,6,6-tetramethylpiperidinyloxy free radical, hydroquinone, p-methoxyhydroquinone, t-butyl-p-hydroquinone, 2,5-di-t-butyl-p-hydroquinone, 1,4-napththalenediol, 4-t-butyl catechol, copper sulfate, coppoer nitrate, cresol, and phenol. When used, the polymerization inhibitors are used in an amount effective to substantially stop polymerization, generally from 25 to 5,000 parts per million, preferably from 50 to 3500 parts per million based on polymer solids.

Suitable swelling agents for hydrophilic core polymer include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. Solvents, such as, for example, ethanol, hexanol, octanol, Texanol® solvent and those described in U.S. Pat. No. 4,594,363, may be added to aid in fixed or permanent base penetration.

When the hydrophilic core polymer is fully encapsulated, it does not titrate with alkali metal bases under normal analytical conditions of 1 hour and at room temperature. To demonstrate full encapsulation samples may be removed during the course of the shell polymerization and titrated with sodium hydroxide.

In an alternative embodiment the hydrophilic core polymer when the aqueous polymeric dispersion is neutralized with a base, may be swollen to an extent that the fully encapsulating shell is ruptured which provides a particle with at least one pore communicating between the surface of the particle and the interior, i.e., core or void, of the particle, according to the teachings of U.S. Pat. No. 5,527,613 and a second emulsion polymer having a different particle size is provided therewith. In another alternative embodiment a particle formed according to the teachings of U.S. Pat. No. 5,409,776 may include a hydrophilic core polymer substantially but incompletely encapsulated by a shell polymer. In that case, the polymer may be swollen to provide a particle with at least one pore communicating between the surface of the particle and the interior, i.e., core or void, of the particle and a second emulsion polymer having a different particle size is provided therewith. An additional embodiment is contemplated wherein multiple cores are provided in a multistaged polymer particle which provides a particle containing, when dry, multiple voids and a second emulsion polymer having a different particle size is provided therewith. Further contemplated is a multistaged polymer wherein the core polymer is a precursor to the acid-functionality containing core polymer of this invention and is subsequently converted to the acid-functionality containing core polymer of this invention by means such as hydrolysis of the core polymer according to the teachings of U.S. Pat. Nos. 5,041,464; 5,157,084; and 5,216,044, whether before, during, or after shell polymer formation, and a second emulsion polymer having a different particle size is provided therewith.

In the second aspect of the present invention there is provided a process for forming an aqueous polymeric dispersion. In this process polymer particles are formed first by emulsion polymerization followed by the formation, in the presence of the first-formed particles, of certain relatively larger multistaged particles which, when dry, contain a void. The polymer compositions, emulsion polymerization ingredients and techniques, and swelling steps are the same as those for the formation of the core and shell polymers of the first emulsion polymer of the process of the first aspect of this invention.

In the third aspect of the present invention there is provided an aqueous polymeric dispersion including (a) 95–25%, preferably 90–40%, more preferably 85–50%, by weight, based on the weight of the solids of the aqueous polymeric dispersion, of a first emulsion polymer having an average particle diameter of 150 to 3000 nanometers, preferably 200–2000 nanometers, more preferably 200–1500 nanometers and (b) 5–75%, preferably 10–60%, more preferably 15–50%, by weight, based on the weight of the solids of the aqueous polymeric dispersion, of a second emulsion polymer having an average particle diameter of 40 to 600 nanometers, preferably 75–500 nanometers, more preferably 100–400 nanometers wherein the ratio of the average particle diameter of the first emulsion polymerized polymer to the average particle diameter of the second emulsion polymerized polymer is from 1.2 to 60, preferably from 1.4 to 50, more preferably from 1.9 to 40 and wherein at least the first emulsion polymer particles, when dry, contain at least one void, the aqueous polymeric dispersion having been formed by the process of any embodiment of the first aspect or the second aspect of the present invention as disclosed herein.

In the fourth aspect of the present invention there is provided a waterborne paper or paperboard coating composition including the aqueous polymeric dispersion of the third aspect of the present invention.

The waterborne paper or paperboard coating composition of this invention contains the aqueous polymeric dispersion of this invention and, optionally, binder(s), water, pigment (s) and coatings adjuvants, as are well known in the art. The predominant pigment used in paper and paperboard coatings is typically clay and/or calcium carbonate but other inorganic or organic pigments may be included such as, for example, delaminated clay, calcined clay, titanium dioxide, calcium carbonate, and solid polystyrene particles. The coating of this invention, when pigment is used, typically contains from 2% to 25%, of the aqueous polymeric dispersion of this invention, based on the dry weight of the aqueous polymeric dispersion of this invention and the dry weight of the pigment in the paper or paperboard coating.

The binder used in paper or paperboard coatings may be a natural or synthetic polymer in the form of a solution or dispersion in water such as, for example, starch, hydroxyethylated starch, protein, polyvinyl acetate, poly(styrene/acrylate) and poly(styrene/butdiene). Binders, when used, are typically used at a total level of 3–20% by dry weight based on the weight of dry pigment.

Coatings adjuvants used in paper or paperboard coatings may optionally include crosslinking agents, lubricants, thickeners, rheology modifiers, buffers, biocides, pigment dispersants, surfactants, and waxes.

The waterborne coating is prepared by techniques which are well known in the paper and paperboard coatings art. For a pigmented coating, the pigment(s) is well-dispersed in a waterborne medium under high shear such as is afforded by a COWLES®mixer. Then the aqueous polymeric dispersion of this invention and binder(s) are added under low shear stirring along with other coatings adjuvants, as desired. The solids content of the waterborne pigmented coating may be from 40% to 70% by weight. The viscosity of the waterborne pigmented coating composition may be from 1000 mPs to 5000 mPs, as measured using a Brookfield viscometer (Model LVT using spindle #3 at 12 rpm); the viscosities appropriate for different application methods vary considerably.

Coated paper or paperboard is paper or paperboard which has a waterborne coating, typically pigmented, applied to one or both sides. The uncoated paper or paperboard substrate typically may have a basis weight of 20–350 g/m.$^2$ and the coating is typically applied in an amount, per side, of 4–30 g./m.$^2$ using conventional coatings methods such as, for example, a trailing blade coater, a size press, and an air knife coater. The paper or paperboard coating is typically dried at temperatures of 50° C. to 100° C., and may be subsequently calendered, at ambient or at elevated temperatures.

In an alternative embodiment incorporating the aqueous polymeric dispersion of this invention, optionally with additional ingredients, into a sheet of paper or paperboard by treating paper or paperboard using, for example, a size press or a saturation bath.

In an alternative embodiment incorporating the aqueous polymeric dispersion of this invention into the formed wet, or undried, sheet of paper or paperboard is contemplated. That is, the aqueous polymeric dispersion of this invention is incorporated into the sheet in the wet-end during the formation of the sheet or the board from fiber. Generally, a predominantly cellulosic fiber pulp slurry is provided, the aqueous polymeric dispersion of this invention is added and mixed, the modified slurry is formed into a wet sheet on a paper machine by techniques well known in the art, and the sheet is dried.

In the fifth aspect of the present invention there is provided a waterborne paint composition including the aqueous polymeric dispersion of the third aspect of the present invention. The waterborne paint composition of this invention contains the aqueous polymeric dispersion of this invention and, optionally, binder(s), water, pigment(s) and coatings adjuvants, as are well known in the art. The waterborne paint composition is prepared by techniques which are well known in the coatings art. First, pigment(s), if desired, are well dispersed in an aqueous medium under high shear such as is afforded by a COWLES mixer or predispersed colorant(s), or mixtures thereof are used. Then the aqueous polymeric dispersion of this invention is added under low shear stirring along with other coatings adjuvants as desired. The aqueous coating composition may contain, in addition to aqueous polymeric dispersion of this invention and optional pigment(s), film-forming or non-film-forming solution or latex polymers in an amount of 0% to 500% by weight of the multistage emulsion polymer, and conventional coatings adjuvants such as, for example, emulsifiers, coalescing agents, plasticizers, antifreezes, curing agents, buffers, neutralizers, thickeners, rheology modifiers, humectants, wetting agents, biocides, antifoaming agents, UV absorbers, fluorescent brighteners, light or heat stabilizers, biocides, chelating agents, dispersants, colorants, waxes, water-repellents, and anti-oxidants.

The solids content of the waterborne paint composition may be from 10% to 70% by volume. The viscosity of the waterborne paint composition may be from 50 centipoise to 50,000 centipoise, as measured using a Brookfield viscometer; viscosities appropriate for different application methods vary considerably.

Conventional coatings application methods such as, for example, brushing, rolling, and spraying methods such as, for example, air-atomized spray, air-assisted spray, airless spray, high volume low pressure spray, and air-assisted airless spray may be used. The waterborne paint composition is typically applied to substrates such as, for example, wood, metal, plastics, cementitious substrates such as, for example, concrete, stucco, and mortar, previously painted or primed surfaces, and weathered surfaces. The waterborne paint composition may be applied to a substrate using conventional coatings application methods such as, for example, by brush, paint roller, and spraying methods such as, for example, air-atomized spray, air-assisted spray, airless spray, high volume low pressure spray, and air-assisted airless spray.

Drying of the waterborne paint composition may be allowed to proceed under ambient conditions such as, for example, at 0° C. to 35° C. or the coating may be dried at elevated temperatures such as, for example, from 35° C. to 150° C.

Experimental Methods

Measurement of Particle Size

A commercial instrument, the CHDF 2000, available from Matec Applied Sciences was used. The CHDF 2000 was equipped with the medium sized capillary from Matec Applied Sciences and a 220 nm UV light detector. Sodium benzoate was used as a reference marker. Carrier fluid was prepared by 1:10 dilution of GR-500(2×) concentrate, obtained from Matec Applied Sciences, with deionized water. The CHDF 2000 was used with the medium sized capillary maintained at 35° C. and the carrier fluid flow rate at 1.4 mL/min. The instrument was calibrated for particle size using commercially available, NIST traceable particle size standard, monodisperse polystyrene latices. For CHDF analysis latex samples were diluted to 0.25 to 0.5 wt % with carrier fluid before injection into the capillary.

Based on the particle size calibration the raw fractogram data was converted into a plot of particle % (by weight) vs particle size; the particle size of the particle modes present was determined from the peaks in the particle % vs particle size plot, and the relative amounts of the two modes was determined by the relative peak integrals.

acid was then added over 38 minutes with the reaction temperature maintained at 94° C. A polymerization inhibitor, the reserved first monomer emulsion, and 960 grams of deionized water were next added to the reactor which was maintained at 85° C. A solution of 48 g aqueous ammonia (28%), 29.9 g sodium dodecylbenzene sulfonate, and 1.6 g of surfactant in 57.5 g deionized water was added. After 20 minutes a solution of 0.009 g ferrous sulfate heptahydrate and 0.009 g Versene in 5.9 g deionized water was added followed by a solution of 1.4 g tert-butylhydroperoxide (70%) in 24 g deionized water and a solution 1.7 g isoascorbic acid in 24 g deionized water. After 15 minutes a solution of 1.4 g tert-butylhydroperoxide (70%) in 24 g deionized water and a solution 1.7 g isoascorbic acid in 24 g deionized water were added to the reactor. The reaction mixture was cooled, a biocide was added, and the reaction product filtered to remove any coagulum formed.

TABLE 1.1

Synthesis parameters for Example 1.

| Sample | First Emulsion Polymer Core Seed Size (nm) | Parts Core Seed | Second Emulsion Polymer Seed Size (nm) | Parts 2nd Seed / WT. % MAA | 2nd Seed Add'n Pt (% monomer) | Monomer Composition |
|---|---|---|---|---|---|---|
| 1 | 390 | 9.1 | 40 | 0.53/1.3 | 63.1 | 9(95.4Sty/4.6AA)//54.1(100Sty)//27.3(80BA/15Sty/5MAA)//9.6(100Sty) |

Centrifuge Test Method

A portion of polymer dispersion was diluted to 18% total solids and 35 grams of the diluted dispersion were centrifuged in 50 ml centrifuge tubes under conditions that produced a clear supernatant which was decanted and weighed. Centrifuging samples at 24000 rpm for 75 minutes in a Sorval™ SA-300A rotor was typically sufficient. Extrapolating from supernatant data of solid particles as disclosed in EP 915108 A supernatant weights less than 24.8 grams indicate the presence of hollow particles.

Abbreviations used herein include: MMA=methyl methacrylate; AA=acrylic acid; MAA=methacrylic acid; BA=butyl acrylate; Sty=styrene.

EXAMPLE 1

Preparation of Aqueous Polymer Dispersion

A 5-liter round-bottom flask equipped with a paddle stirrer, thermocouple, nitrogen inlet, and reflux condenser was charged with a mixture of 1161 g hot deionized water, 1.2 g sodium persulfate, and 318.4 g 390 nm latex seed with polymer composition 60MMA/40MAA and solids content of 31% which had been prepared according to the procedure of Example 0 in U.S. Pat. No. 5,494,971. A first monomer emulsion consisting of 135 g deionized water, 1.65 g sodium dodecylbenzene sulfonate (23%), and 786.2 g styrene was prepared. Gradual addition of this first monomer emulsion was begun as well as gradual addition of 2.9 g sodium persulfate in 108 g deionized water. A solution of 4.4 g acrylic acid in 85 g deionized water was added over 25 minutes while the mixture was maintained at 85° C. The addition of the first monomer emulsion was then continued for an additional 77 minutes with the reaction temperature maintained at 92° C. until 123 g of this first monomer emulsion remained which was reserved. Then 17.3 g 40 nm latex seed with solids content of 33% was added to the reactor. A second monomer emulsion consisting of 26.4 g deionized water, 25.8 g sodium dodecylbenzene sulfonate (23%), 237.2 g BA, 44.5 g styrene, and 14.8 g methacrylic

TABLE 1.2

Characterization parameters for Example 1

| | CHDF Data | | | Centrifuge Data | Other Physicals | | |
|---|---|---|---|---|---|---|---|
| Sample | Large Mode Size (nm) | Small Mode Size (nm) | Fraction Small Mode (%) | Supernatant Wt (g) | % TS | pH | Visc (cps) |
| 1 | 780 | 50 | 5 | 16.8 | 26.1 | 9.0 | 1000 |

Note: Centrifugation was effected by diluting the aqueous polymer dispersion to 18% solids, centrifuging to obtain clear supernatant, decanting, and weighing.

EXAMPLE 2

Preparation of Aqueous Polymer Dispersion

A 5-liter round-bottom flask equipped with a paddle stirrer, thermocouple, nitrogen inlet, and reflux condenser was charged with a mixture of 1162 g hot deionized water, 1.2 g sodium persulfate, and 318.4 g 390 nm latex seed with polymer composition 60MMA/40MAA and solids content of 31% which had been prepared according to the procedure of Example 0 in U.S. Pat. No. 5,494,971. A first monomer emulsion consisting of 135 g deionized water, 1.65 g sodium dodecylbenzene sulfonate (23%), and 786.2 g styrene was prepared. Gradual addition of this first monomer emulsion was begun as well as gradual addition of 2.9 g sodium persulfate in 108 g deionized water. A solution of 4.4 g acrylic acid in 108 g deionized water was added over 25 minutes while the mixture was maintained at 85° C. The addition of the first monomer emulsion was then continued for an additional 65 minutes with the reaction temperature maintained at 92° C. until 123 g of this first monomer emulsion remained which was reserved. A solution of 47.3 g sodium dodecylbenzene sulfonate (23%) and 6 g deionized water was added to the reactor. A second monomer emulsion consisting of 26.4 g deionized water, 25.8 g sodium dodecylbenzene sulfonate (23%), 237.2 g butyl acrylate, 44.5 g styrene, and 14.8 g methacrylic acid was then added over 40 minutes with the reaction temperature maintained at 94° C. A polymerization inhibitor, the reserved first monomer emulsion, and 960 g deionized water were next added to the reactor which was maintained at 85° C. A solution of 40 g aqueous ammonia (28%), 29.9 g sodium dodecylbenzene sulfonate, and 1.6 g of another surfactant in 57.5 g deionized water was added. After 20 minutes a solution of 0.009 g ferrous sulfate heptahydrate and 0.009 g Versene in 9.8 g deionized water was added followed by a solution of 1.4 g tert-butylhydroperoxide (70%) in 24 g deionized water and a solution of 1.7 g isoascorbic acid in 24 g deionized water. After 15 minutes a solution of 1.4 g tert-butylhydroperoxide (70%) in 24 g deionized water and a solution of 1.7 g isoascorbic acid in 24 g deionized water were added to the reactor. The reaction mixture was cooled, a biocide was added, and the reaction product filtered to remove any coagulum formed.

EXAMPLE 3
Preparation of Aqueous Polymeric Dispersion

Example 3 was prepared according to the process of Example 2.

Synthesis parameters for Examples 2–3 are presented in Table 3.1 and Characterization parameters for Examples 2–3 are presented in Table 3.2.

5,494,971. A first monomer emulsion consisting of 25 g deionized water, 1.5 g sodium dodecylbenzene sulfonate (23%), 5.4 g butyl methacrylate, 53.4 g methyl methacrylate, and 1.2 g methacrylic acid was prepared. Gradual addition of this first monomer emulsion to the reactor was completed in 35 minutes at a temperature of 78–80° C. A second monomer emulsion consisting of 145 g deionized water, 2.7 g sodium dodecylbenzene sulfonate (23%), 406.8 g styrene, 2.4 g carboxylic acid surfactant, and 1.2 g allyl methacrylate was prepared and fed to the reactor over a period of 45 minutes while the temperature was allowed to increase to 88° C. Along with the second monomer emulsion, a co-feed solution of 1.0 g sodium persulfate in 10 g deionized water was fed to the reactor. Upon completion of monomer emulsion #2 and the co-feed solution, a solution of 52.4 g sodium dodecylbenzene sulfonate (23%), and 50 g deionized water was added to the reactor. A third monomer emulsion consisting of 40 g deionized water, 2.0 g sodium dodecylbenzene sulfonate (23%), 58.8 g butyl acrylate, 58.8 g styrene, and 2.4 g methacrylic acid was then added to the reactor over 10 minutes with the reaction temperature allowed to rise to 91° C. Upon completion of monomer emulsion #3 a polymerization inhibitor was added to the reactor, and a fourth monomer emulsion consisting of 21 g deionized water, 1 g sodium dodecylbenzene sulfonate (23%), and 72 g styrene was added to the reactor over a period of 5 minutes while the temperature of the reaction was maintained at 85° C. A solution of 42 g aqueous ammonia (28%), and 50 g deionized water was added to the reactor. After 10 minutes a solution of 0.02 g ferrous sulfate heptahydrate and 0.02 g Versene in 22 g deionized water was added to the reactor. This was followed by addition of a solution of 1.5 g tert-butylhydroperoxide (70%) in 30 g deionized water. A solution of 0.75 g isoascorbic acid in 30 g deionized water was then added to the reactor. The reaction mixture was cooled, a biocide was added, and the reaction product filtered to remove any coagulum formed. The final latex had a solids content of 25.0%, a pH of 9.9, and a Brookfield viscosity of 180 cps.

TABLE 3.1

Synthesis parameters for Examples 2-3

| Sample | First Emulsion Polymer Core Seed Size (nm) | Parts Core Seed | Surfactant Addition | Composition |
|---|---|---|---|---|
| 2 | 390 | 9.1 | 1.0% DS-4 added after 63.1% shell monomer | 9(95.4Sty/4.6AA)//54.1(100Sty)//27.3(80BA/15Sty/5MAA)//9.6(100Sty) |
| 3 | 390 | 9.1 | 0.55% DS-4 added after 63.1% shell monomer | 9(95.4Sty/4.6AA)//54.1(100Sty)//27.3(80BA/15Sty/5MAA)//9.6(100Sty) |

TABLE 3.2

Characterization of Examples 2–3

| Sample | Large Mode Size (nm) | Small Mode Size (nm) | Fraction Small Mode (%) | Centrifuge Data Supernatant Wt (g) | % TS | pH | Other Physicals Visc (cps) |
|---|---|---|---|---|---|---|---|
| 2 | 760 | 300 | 48 | 12.4 | 26.5 | 9.1 | 13400 |
| 3 | 760 | 260 | 55 | 13.9 | 26.6 | 9.1 | 3750 |

EXAMPLE 4
Preparation of Aqueous Polymeric Dispersion

Preparation of Example 4. A 5-liter round-bottom flask equipped with a paddle stirrer, thermocouple, nitrogen inlet, and reflux condenser was charged with a mixture of 1200 g hot deionized water, 3.8 g sodium persulfate, and 186.0 g 400 nm latex seed with polymer composition 60MMA/40MAA and solids content of 32.3% which had been prepared by the procedure of Example 0 in U.S. Pat. No.

EXAMPLE 5
Preparation and Evaluation of Aqueous Paint Composition

The grind ingredients (pigment, dispersant, defoamer, cosolvent, etc) were mixed at high speed (Cowles mixer). At lower speed the grind was letdown with latex binder, coalescent, thickener, and, additional defoamer and ammonia neutralizer as noted below. Example 4 aqueous polymeric dispersion sample was mixed into the paint which was diluted to the desired final volume solids level with water. Two types of paints were prepared, one a below critical PVC flat/sheen formulation(Table 5.1) and the other a above critical PVC flat formulation(Table 5.2). Films of the two types of paints were drawn down and tested for tint strength. Additionally films of the above critical PVC flat paint were tested for scrub resistance.

TABLE 5.1.

Flat/Sheen Formulation with aqueous polymeric dispersion of Example 4

| Material Name | Weight (g) | Paint Characteristics | |
|---|---|---|---|
| Grind: | | Pigment Volume Content | 49.9 |
| Water | 30.00 | Volume Solids | 34.7 |
| Propylene Glycol | 60.61 | | |
| Dispersant (TAMOL 1124) (50.0%) | 4.92 | Measured Film Properties: | |
| Surfactant (TRITON CF-10) | 1.00 | Tint Strength | 46.0 |
| Defoamer (COLLOID 643) | 2.00 | | |
| Biocide (KATHON LX 1.5%) | 2.00 | | |
| Rozone 2000 | 6.00 | | |
| Titanium dioxide (TI-PURE R-706) | 200.00 | | |
| MINEX 4 | 100.00 | | |
| DIAFIL 525 | 25.00 | | |
| Lampblack (COLORTREND 8807). | 10.40 | | |
| Letdown: | | | |
| Acrylic latex (RHOPLEX ML-200) | 306.13 | | |
| Coalescent (TEXANOL) | 9.55 | | |
| Defoamer (COLLOID 643) | 2.00 | | |
| Aqueous Ammonia (28%) | 2.00 | | |
| Thickener (NATROSOL 250 MHR (2.5%) | 134.24 | | |
| Rheology modifier (ACRYSOL RM-2020) | 9.44 | | |
| Water | 75.00 | | |
| Example 4 dispersion | 81.33 | | |
| Water | 30.35 | | |

The aqueous polymeric dispersion of Example 4 of this invention was formulated into a paint with acceptable tint strength.

Table 5.2.

Flat Formulation with aqueous polymeric dispersion of Example 4

| Material Name | Weight (g) | Paint Characteristics | |
|---|---|---|---|
| Grind: | | Pigment Volume Content | 71.5 |
| Water | 10.00 | Volume Solids | 32.0 |
| Dispersant (TAMOL 731A (25%)) | 0.44 | | |
| KTPP (100.0%) | 0.09 | Meseared Film Properties: | |
| Surfactant (TRITON CF-10) | 0.10 | Tint Strength | 48.3 |
| Defoamer (COLLOID 643) | 0.15 | Scrub (1st cut) | 46 |
| Propylene Glycol | 0.87 | Scrub (1st line) | 59 |
| Aqueous Ammonia (28%) | 0.15 | | |
| Rheology modifier (ACRYSOL TT-935) | 0.63 | | |
| Titanium dioxide(TI-PURE R-902) | 6.46 | | |
| Clay (ASP-400) | 6.66 | | |
| CELITE 281 | 1.31 | | |
| Snowflake calcium carbonate | 7.57 | | |
| Lampblack (COLORTREND 8807) | 0.52 | | |

Table 5.2.-continued

Flat Formulation with aqueous polymeric dispersion of Example 4

| Material Name | Weight (g) | Paint Characteristics |
|---|---|---|
| Letdown: | | |
| Water | 5.02 | |
| Res 661 | 7.99 | |
| TEXANOL | 0.40 | |
| Rheology modifier (ACRYSOL TT-935) | 0.17 | |
| Example 4 dispersion | 3.50 | |
| Water | 5.03 | |

The aqueous polymeric dispersion of Example 4 of this invention was formulated into a paint with acceptable tint strength.

What is claimed is:

1. A process for forming an aqueous polymeric dispersion comprising
   (1) forming emulsion-polymerized multistaged first polymer particles comprising
      (a) a hydrophilic core polymer formed from 5% to 100% by weight, based on the total weight of said core polymer, of a hydrophilic monoethylenically unsaturated monomer and from 0% to 95% by weight, based on the total weight of said core polymer, of at least one nonionic monoethylenically unsaturated monomer;
      (b) a first shell polymer formed from 90% to 99.9% by weight, based on the total weight of said first shell polymer, of at least one nonionic monoethylenically unsaturated monomer and from 0.1% to 10% by weight, based on the total weight of said first shell polymer, of an acid functional monoethylenically unsaturated monomer, wherein said first shell polymer fully encapsulates said core polymer, wherein the ratio of the weight of said core polymer to the weight of said first shell polymer is from 1:2 to 1:100, and wherein said first shell polymer has a glass transition temperature greater than 50° C.; and
      (c) a second shell polymer formed from 93% to 99.9% by weight, based on the total weight of said second shell polymer, of at least one nonionic monoethylenically unsaturated monomer and from 0.1% to 7% by weight, based on the total weight of said second shell polymer, of an acid functional monoethylenically unsaturated monomer, wherein said second shell polymer is formed in the presence of said first shell polymer, and wherein said second shell polymer has a glass transition temperature from 10° C. to −50° C., and wherein said second shell polymer is at least 10% by weight of the total weight of said first shell polymer and said second shell polymer;
   (2) forming a second emulsion polymer in the presence of said first emulsion polymer by
      (a) adding, after 2% by weight of said core polymer has been formed, an amount of surfactant sufficient to generate new particles or an emulsion-polymerized seed latex having a particle diameter less than 200 nanometers to the polymerization;
      (b) then adding any remainder of said first shell polymer monomer mixture and then any remainder of said second shell polymer monomer mixture and from 0 to 90% by weight, based on the weight of the solids of said aqueous polymeric dispersion, of at least one ethylenically unsaturated monomer;

(3) effecting polymerization of at least 95% of all added monomer by weight based on the weight of the solids of said aqueous polymeric dispersion; and (4) neutralizing said aqueous dispersion formed with a base so as to swell said core and form particles which, when dry, contain a void.

2. A process for forming an aqueous polymeric dispersion comprising (1) forming a first emulsion polymer comprising particles formed from at least one ethylenically unsaturated monomer;

(2) forming a multistaged second emulsion polymer comprising (a) a hydrophilic core polymer formed from 5% to 100% by weight, based on the total weight of said core polymer, of a hydrophilic monoethylenically unsaturated monomer and from 0% to 95% by weight, based on the total weight of said core polymer, of at least one nonionic monoethylenically unsaturated monomer;

(b) a first shell polymer formed from 90% to 99.9% by weight, based on the total weight of said first shell polymer, of at least one nonionic monoethylenically unsaturated monomer and from 0.1% to 10% by weight, based on the total weight of said first shell polymer, of an acid functional monoethylenically unsaturated monomer, wherein said first shell polymer fully encapsulates said core polymer, wherein the ratio of the weight of said core polymer to the weight of said first shell polymer is from 1:2 to 1:100, and wherein said first shell polymer has a glass transition temperature greater than 50° C.; and (c) a second shell polymer formed from 93% to 99.9% by weight, based on the total weight of said second shell polymer, of at least one nonionic monoethylenically unsaturated monomer and from 0.1% to 7% by weight, based on the total weight of said second shell polymer, of an acid functional monoethylenically unsaturated monomer, wherein said second shell polymer is formed in the presence of said first shell polymer, and wherein said second shell polymer has a glass transition temperature from 10° C. to −50° C., and wherein said second shell polymer is at least 10% by weight of the total weight of said first shell polymer and said second shell polymer; and (3) effecting polymerization of at least 95% of all added monomer by weight based on the weight of the solids of said aqueous polymeric dispersion; and (4) neutralizing said aqueous dispersion formed with a base so as to swell said core and form second emulsion polymer particles which, when dry, contain a void.

3. An aqueous polymeric dispersion comprising (a) 95–25% by weight, based on the weight of the solids of said aqueous polymeric dispersion, of a first emulsion polymer having an average particle diameter of 150 to 3000 nanometers and (b) 5–75% by weight, based on the weight of the solids of said aqueous polymeric dispersion, of a second emulsion polymer having an average particle diameter of 40 to 600 nanometers wherein the ratio of said average particle diameter of said first emulsion polymerized polymer to said average particle diameter of said second emulsion polymerized polymer is from 1.2 to 60, and wherein at least said first emulsion polymer particles, when dry, contain at least one void, said aqueous polymeric dispersion having been formed by the process of claim 1 or claim 2.

4. A waterborne paper or paperboard coating composition comprising the aqueous polymeric dispersion of claim 3.

5. A waterborne paint composition comprising the aqueous polymeric dispersion of claim 3.

* * * * *